US005376433A

United States Patent [19]

Fujimaki

[11] Patent Number: 5,376,433
[45] Date of Patent: Dec. 27, 1994

[54] THERMAL TRANSFER INK

[75] Inventor: Satoshi Fujimaki, Tochigi, Japan

[73] Assignee: Sony Corporation, Tokyo, Japan

[21] Appl. No.: 41,034

[22] Filed: Mar. 31, 1993

[30] Foreign Application Priority Data

Apr. 8, 1992 [JP] Japan .................................. 4-116895

[51] Int. Cl.[5] .................................................. B32B 3/00
[52] U.S. Cl. ..................................... 428/195; 428/207; 428/447; 428/913; 524/500; 524/520; 524/521; 524/538; 524/567
[58] Field of Search ................. 106/20 R; 8/467, 471; 503/227; 428/327, 195, 207, 447, 913; 524/500–542, 567

[56] References Cited

U.S. PATENT DOCUMENTS

| | | | |
|---|---|---|---|
| 4,122,226 | 10/1978 | Vassiliou | 428/187 |
| 4,559,273 | 12/1985 | Kutsukake et al. | 428/484 |
| 4,711,802 | 12/1987 | Tannenbaum | 428/207 |
| 5,043,318 | 8/1991 | Kawakami et al. | 503/227 |
| 5,070,068 | 12/1991 | Nishitani | 503/227 |
| 5,258,234 | 11/1993 | Ide et al. | 428/500 |

*Primary Examiner*—Paul Lieberman
*Assistant Examiner*—Margaret Einsmann
*Attorney, Agent, or Firm*—Hill, Steadman & Simpson

[57] ABSTRACT

Disclosed herein is a thermal transfer printing medium which provides high-quality images superior in heat resistance and rub resistance owing to a thermal transfer ink of specific composition which permits the fusible ink layer to cut sharp for transfer. The fusible ink layer is formed from a thermal transfer ink composed of a colorant, thermoplastic resin, and particulate fluorocarbon resin or silicone resin in an amount of 10–70 wt %.

4 Claims, 1 Drawing Sheet

THERMAL TRANSFER INK

BACKGROUND OF THE INVENTION

1. Field of the Invention

The present invention relates to thermal transfer ink to be used for thermal transfer printing by a thermal head. The present invention also relates to a thermal transfer printing medium which employs said thermal transfer ink.

2. Description of the Prior Art

The thermal transfer printing system is now in general use for computer printers, word processors, facsimiles, and copying machines. It employs a thermal transfer printing medium 10 (shown in FIG. 1) which consists of a substrate sheet 1, and a release layer 2 and an ink layer 3 laminated consecutively on one side of the substrate, and a protective layer 4 laminated on the other side of the substrate. When the thermal transfer printing medium 10 is heated by a heat-generating element such as thermal head in contact with the protective layer 4, the ink layer 3 is fused and the fused ink is transferred to printing paper on which images are to be made. The release layer 2 ensures the smooth transfer of ink to printing paper with a small amount of energy. The protective layer 4 permits the thermal transfer printing medium to run smoothly without sticking to the thermal head.

The thermal transfer printing medium 10 has an ink layer 3 which is conventionally a fusible thermal transfer ink composed of a colorant and a wax-based binder. The conventional thermal transfer ink gives transfer images which are poor in heat resistance and rub resistance. To eliminate this disadvantage, attempts are being made to use a thermoplastic resin as the principal component of the binder. Such attempts, however, have posed another problem associated with the "cutting-off" of the ink layer at the time of transfer. In other words, the ink layer containing a binder of thermoplastic resin does not cut sharp at the boundary between the heated part and the unheated part. This results in blurred transfer images.

SUMMARY OF THE INVENTION

The present invention was completed to address the above-mentioned problems involved in the prior art technology. It is an object of the present invention to provide a thermal transfer ink containing a binder composed mainly of a thermoplastic resin. The thermal transfer ink gives high-quality transfer images having good heat resistance and rub resistance and permits the ink layer to cut sharp for transfer.

DETAILED DESCRIPTION OF THE INVENTION

Figure 1:
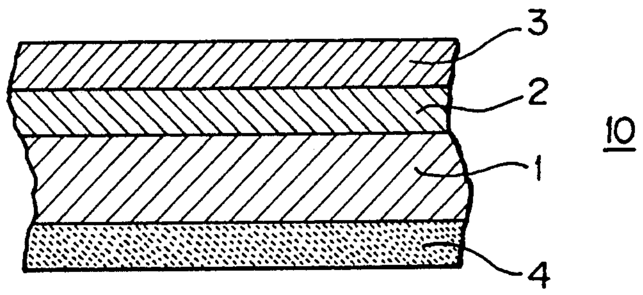
FIG. 1 is a sectional view of a thermal transfer printing medium.

The present invention is based on the finding that even though the thermal transfer ink contains a binder composed mainly of thermoplastic resin, the ink layer cuts sharp for transfer if the ink contains particles of fluorocarbon resin or silicone resin.

The present invention is embodied in a thermal transfer ink which comprises containing therein a colorant, thermoplastic resin, and particulate fluorocarbon resin or silicone resin in an amount of 10–70 wt %.

The present invention is also embodied in a thermal transfer printing medium composed of a substrate and a fusible ink layer formed thereon, characterized in that the fusible ink layer is formed from the thermal transfer ink defined above.

According to the present invention, the thermal transfer ink contains a thermoplastic resin as the major constituent of the binder and also contains a particulate fluorocarbon resin or silicone resin. It forms the ink layer of the thermal transfer printing medium of the present invention.

According to the present invention, the particulate fluorocarbon resin or silicone resin should be one which has a higher softening point than the resin as the principal component of the binder, so that it does not soften at the time of transfer. It should preferably have a particle diameter of 0.3–10 μm, which is smaller than the thickness of the ink layer.

The thermoplastic resin as the principal component of the binder includes, for example, polyamide resin, polyester resin, acrylic resin, vinyl chloride resin, and vinyl chloride-vinyl acetate copolymer. They may be used alone or in combination with one another. Polyamide resin is desirable if the transferred images need heat resistance as in the case of garment tags which are subject to ironing.

The thermal transfer ink contains a colorant which is a pigment or dye in general use for the conventional fusion transfer printing system. Examples of the colorant includes carbon black, Fast Yellow G, Disazo Yellow AAA, Disazo Orange PMF, Brilliant Carmine 6B, Lake Red C, Barium Red 2B, Phthalocyanine Blue, Tartrazine Lake, Rhodamine 6G Lake, Victoria Pure Blue Lake, Milori Blue, titanium oxide, zinc white, and aluminum powder. They may be used alone or in combination with one another.

If necessary, the thermal transfer ink may be incorporated with wax (such as carnauba wax, candelilla wax, beeswax, paraffin wax, and microcrystalline wax), plasticizer, and dispersing agent.

According to the present invention, the thermal transfer ink should preferably be composed of 10–70 wt % of particulate fluorocarbon resin or silicone resin, 1–30 wt % of colorant, and 20–80 wt % of thermoplastic resin.

The thermal transfer printing medium of the present invention may be made up of the same components as the conventional one so long as the fusible ink layer is formed from the above-mentioned thermal transfer ink. That is, it may consists of a substrate sheet 1, and a release layer 2 and an ink layer 3 laminated consecutively on one side of the substrate, and a protective layer 4 laminated on the other side of the substrate. The substrate 1 may be polyester film, polyimide film, or condenser paper. The release layer 2 may be formed from wax (such as carnauba wax and candelilla wax) having a melting point of 50°–100° C. The protective layer 4 may be formed from silicone resin, fluorocarbon resin, nitrocellulose resin, and any other heat resistant resins. It is desirable that the substrate 1 be 3–10 μm thick, the release layer 2 be 0.1–10 μm thick, the ink layer be 0.3–10 82 m thick, and the protective layer be 0.1–1 μm thick.

As mentioned above, the thermal transfer ink contains a binder whose principal component is a thermoplastic resin. It is used to form the ink layer of the thermal transfer printing medium, which gives transferred images superior in heat resistance and rub resistance. It also contains a particulate fluorocarbon resin or silicone resin, which permits the ink layer to cut sharp for transfer. This results in clear, high-quality transfer images.

EXAMPLES

The invention will be described in more detail with reference to the following examples.

Example 1

A thermal transfer ink was prepared from 2 parts by weight (10 wt %) of silicone fine powder ("Tospearly 108" made by Toshiba Silicone Co., Ltd.), 10 parts by weight of carbon black dispersion ("MHI Black No. 236", 30 wt % active ingredient, made by Mikuni Shikiso Co., Ltd.), 15 parts by weight of polyamide resin ("DPX-1163" made by Henkel Hakusui Co., Ltd.), 33 parts by weight of toluene, and 40 parts by weight of isopropyl alcohol.

A 5 μm thick polyester film was coated with acryl silicone resin ("Simack US290" made by Toagosei Chemical Industry Co., Ltd.) to form a protective layer on one side thereof, and also coated with a mixture of 90% carnauba wax and 10% polyester resin ("Byron 200" made by Toyobo Co., Ltd.) to form a release layer on the other side thereof. Onto the release layer was applied the thermal transfer ink (prepared as mentioned above) using a wire bar. Thus there was obtained a thermal transfer printing medium having a 1-μm thick release layer and a 1-μm thick ink layer (after drying).

The resulting thermal transfer printing medium was used for printing by a bar code printer ("BS-8 mkII" made by Automicks Co., Ltd.) on printing paper having a Bekk smoothness of 200 sec. The thermal sensitivity and print quality were visually evaluated. (Print quality is associated with how sharp the ink layer cuts for transfer.) The results are shown in Table 1. The sample was satisfactory.

Example 2

A thermal transfer ink was prepared from 8 parts by weight (40 wt %) of silicone fine powder, 10 parts by weight of carbon black dispersion, 9 parts by weight of polyamide resin, 33 parts by weight of toluene, and 40 parts by weight of isopropyl alcohol.

Using this thermal transfer ink, a thermal transfer printing medium was produced in the same manner as in Example 1.

The resulting thermal transfer printing medium was used for printing by a bar code printer. The thermal sensitivity and print quality were visually evaluated. The results are shown in Table 1. The sample was satisfactory.

EXAMPLE 3

A thermal transfer ink was prepared from 14 parts by weight (70 wt %) of silicone fine powder, 10 parts by weight of carbon black dispersion, 3 parts by weight of polyamide resin, 33 parts by weight of toluene, and 40 parts by weight of isopropyl alcohol.

Using this thermal transfer ink, a thermal transfer printing medium was produced in the same manner as in Example 1.

The resulting thermal transfer printing medium was used for printing by a bar code printer. The thermal sensitivity and print quality were visually evaluated. The results are shown in Table 1. The sample was satisfactory.

EXAMPLE 4

A thermal transfer ink was-prepared from 8 parts by weight (40 wt %) of silicone fine powder, 10 parts by weight of carbon black dispersion, 9 parts by weight of polyester resin ("Byron 200" made by Toyobo Co., Ltd.), 33 parts by weight of toluene, and 40 parts by weight of isopropyl alcohol.

Using this thermal transfer ink, a thermal transfer printing medium was produced in the same manner as in Example 1.

The resulting thermal transfer printing medium was used for printing by a bar code printer. The thermal sensitivity and print quality were visually evaluated. The results are shown in Table 1. The sample was satisfactory.

EXAMPLE 5

A thermal transfer ink was prepared from 8 parts by weight (40 wt %) of fluorocarbon resin powder ("KTL 500F" made by Kitamura Co., Ltd.), 10 parts by weight of carbon black dispersion, 9 parts by weight of polyamide resin, 33 parts by weight of toluene, and 40 parts by weight of isopropyl alcohol.

Using this thermal transfer ink, a thermal transfer printing medium was produced in the same manner as in Example 1.

The resulting thermal transfer printing medium was used for printing by a bar code printer. The thermal sensitivity and print quality were visually evaluated. The results are shown in Table 1. The sample was satisfactory.

COMPARATIVE EXAMPLE 1

A thermal transfer ink was prepared from 10 parts by weight of carbon black dispersion, 17 parts by weight of polyamide resin, 33 parts by weight of toluene, and 40 parts by weight of isopropyl alcohol. (The ink was not incorporated with silicone fine powder or fluorocarbon resin powder.)

Using this thermal transfer ink, a thermal transfer printing medium was produced in the same manner as in Example 1.

The resulting thermal transfer printing medium was used for printing by a bar code printer. The thermal sensitivity and print quality were visually evaluated. The results are shown in Table 1. The sample was good in thermal sensitivity but poor in print quality (with blurred images).

COMPARATIVE EXAMPLE 2

A thermal transfer ink was prepared from 16 parts by weight (80 wt %) of silicone fine powder, 10 parts by weight of carbon black dispersion, 1 parts by weight of polyamide resin, 33 parts by weight of toluene, and 40 parts by weight of isopropyl alcohol.

Using this thermal transfer ink, a thermal transfer printing medium was produced in the same manner as in Example 1.

The resulting thermal transfer printing medium was used for printing by a bar code printer. It was incapable of thermal transfer due to poor thermal sensitivity.

COMPARATIVE EXAMPLE 3

A thermal transfer ink was prepared from 10 parts by weight of carbon black dispersion, 17 parts by weight of polyester resin, 33 parts by weight of toluene, and 40 parts by weight of isopropyl-alcohol. (The ink was not incorporated with silicone fine powder or fluorocarbon resin powder.)

Using this thermal transfer ink, a thermal transfer printing medium was produced in the same manner as in Example 1.

The resulting thermal transfer printing medium was used for printing by a bar code printer. The thermal sensitivity and print quality were visually evaluated. The results are shown in Table 1. The sample was good in thermal sensitivity but poor in print quality.

TABLE 1

| | Silicone fine powder | Fluorocarbon resin powder | Binder resin | Thermal sensitivity | Print quality |
|---|---|---|---|---|---|
| Example 1 | 10 wt % | — | Polyamide | good | good |
| Example 2 | 40 wt % | — | Polyamide | good | good |
| Example 3 | 40 wt % | — | Polyamide | good | good |
| Example 4 | 40 wt % | — | Polyester | good | good |
| Example 5 | — | 40 wt % | Polyamide | good | good |
| Comparative Example 1 | — | — | Polyamide | good | poor |
| Comparative Example 2 | 80 wt % | — | Polyamide | poor | incapable of printing |
| Comparative Example 3 | — | — | Polyester | good | poor |

As mentioned above, the thermal transfer printing medium of the present invention provides high-quality images superior in heat resistance and rub resistance owing to the thermal transfer ink of specific composition which permits the ink layer to cut sharp for transfer.

What is claimed is:

1. A thermal transfer ink, after drying consisting essentially of a colorant, thermoplastic resin selected from the group consisting of: polyamide resin; vinyl chloride resin; and vinyl-chloride-vinyl acetate copolymer, and particulate resin selected from fluorocarbon resin or silicone resin in an amount of 10–70 wt %.

2. A thermal transfer print ink medium composed of a substrate and a fusible ink layer formed thereon, wherein said fusible ink layer consists essentially of a colorant, thermoplastic resin selected from the group consisting of: polyamide resin; vinyl chloride resin; and vinyl-chloride-vinyl acetate copolymer and particulate resin selected from fluorocarbon resin or silicone resin in an amount of 10–70 wt %.

3. A thermal transfer ink which, after drying, consists essentially of 1–30% by weight of a colorant, 20–80% by weight of a thermoplastic binder resin selected from the group consisting of polyamide resins, vinyl chloride resins, vinyl chloride-vinyl acetate copolymer resins and combinations of any of the foregoing resins, and 10–70% by weight of a particulate fluorocarbon resin or a particulate silicone resin.

4. A thermal transfer printing medium including a substrate and a fusible ink layer formed thereon, wherein said fusible ink layer, after drying, consists essentially of 1–30% by weight of a colorant, 20–80% by weight of a thermoplastic binder resin selected from the group consisting of polyamide resins, vinyl chloride resins, vinyl chloride-vinyl acetate copolymer resins and combinations of any of the foregoing resins, and 10–70% by weight of a particulate fluorocarbon resin or a particulate silicone resin.

* * * * *